United States Patent [19]
Waller

[11] Patent Number: 4,639,173
[45] Date of Patent: Jan. 27, 1987

[54] APPARATUS FOR PRODUCING A CAM WITH SINUSOIDAL CAM LOBE SURFACES

[75] Inventor: Francis E. Waller, Dover, Fla.

[73] Assignees: Leonard J. E. Waller; Wm. J. Gdovin; Walter J. Monacelli, ; part interest to each

[21] Appl. No.: 761,487

[22] Filed: Aug. 1, 1985

Related U.S. Application Data

[60] Continuation-in-part of Ser. No. 582,263, Feb. 22, 1984, abandoned, which is a continuation-in-part of Ser. No. 420,390, Sep. 20, 1982, abandoned, which is a division of Ser. No. 320,213, Nov. 12, 1981, Pat. No. 4,432,310, which is a continuation of Ser. No. 265,259, May 19, 1981, abandoned, which is a continuation of Ser. No. 35,553, May 3, 1979, abandoned.

[51] Int. Cl.$^4$ ............................................... B23C 3/08
[52] U.S. Cl. .................................................. 409/122
[58] Field of Search ................... 29/56.5, 558; 409/65, 409/66, 76, 84, 111, 1.2, 116, 165, 80, 122, 123; 51/95 R, 95 WH, 118

[56] References Cited

FOREIGN PATENT DOCUMENTS 17074  6/1881  Fed. Rep. of Germany ........ 409/80

OTHER PUBLICATIONS

Getriebetechnik Lehrbuch, pp. 391, 392, 402, 403, 6-1979, Johannes Volmer.

Primary Examiner—William R. Briggs
Attorney, Agent, or Firm—Walter J. Monacelli

[57] ABSTRACT

The apparatus described herein is capable of producing a cam which has a cam lobe having opposite sinusoidal surfaces which have at least two rises and at least two dips in 360° of each sinusoidal surface with the rises in one such surface being opposite to the dips in the other such surfaces. These sinusoidal surfaces are designed so that they may be in full, centerline contact with pairs of bearings attached to connecting rods, these bearings being on opposite sides of the cam lobe and at one time being driven in one direction by one of the two pistons in each pair and then at another time in the opposite direction by the other piston in that pair, the two pistons of that pair being connected to each other by the same connecting rod carrying the bearings which are adapted to press against the cam lobe. The surfaces of the cam lobe are designed to avoid friction or binding between the bearings and the cam lobe. An engine for which this cam is particularly useful is described in applicant's U.S. Pat. No. 4,432,310 issued on Feb. 21, 1984.

4 Claims, 53 Drawing Figures

DETERMINATION OF CONTACT POINTS OF CAM WITH OUTER EDGE OF BEARING

DETERMINATION OF CONTACT POINTS OF CAM WITH INNER EDGE OF BEARING

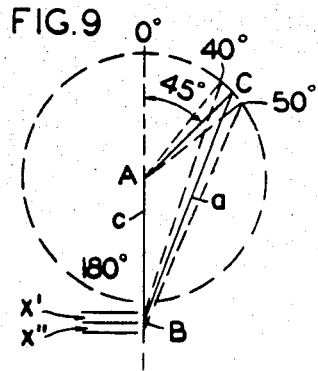
FIG. 9
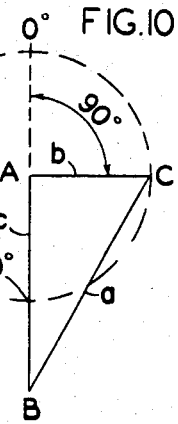
FIG. 10
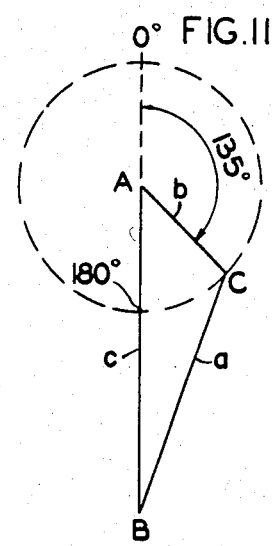
FIG. 11
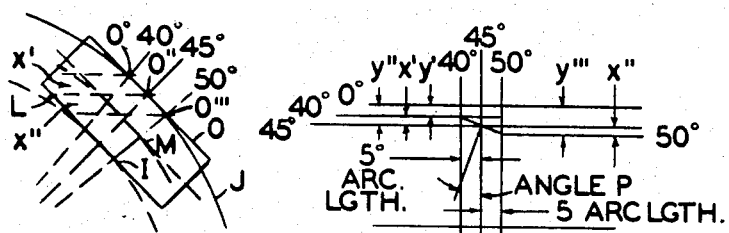
FIG. 12
FIG. 13
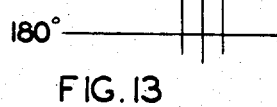
FIG. 14
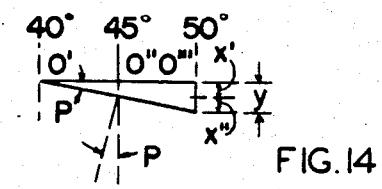
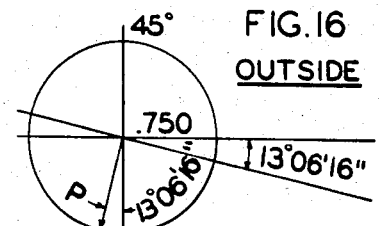
FIG. 16
OUTSIDE
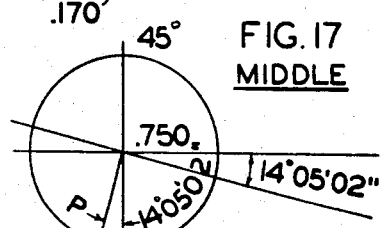
FIG. 17
MIDDLE
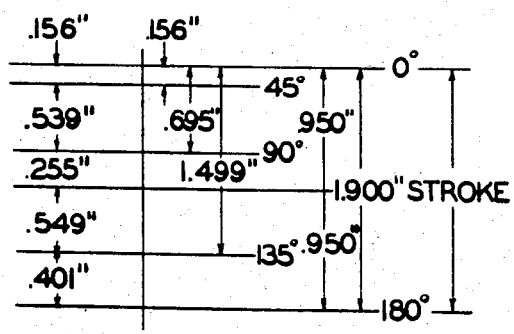
FIG. 15
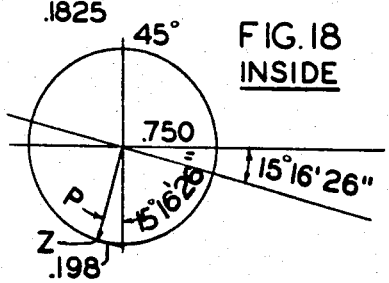
FIG. 18
INSIDE

0°

22.5°

45°

67.5°

90°

112.5°

135°

157.5°

180°

0°

22.5°

45°

67.5°

90°

112.5°

135°

157.5°

180°

| CRANKSHAFT TRAVEL (4" STROKE) DEGREES | MEASURE OF STROKE | | PER CENT OF STROKE | TRAVEL OF WALLER CAM DESIGNED TO DUPLICATE CRANKSHAFT OPERATION (4" STROKE) DEGREES |
|---|---|---|---|---|
| 0° | | | | 0° |
| 30° | .196" | | 4.90% | 15° |
| 60° | .586" | | 14.65% | 30° |
| 90° | .926" | | 23.15% | 45° |
| 120° | 1.074" | 4" | 26.85% | 60° |
| 150° | .878" | | 21.95% | 75° |
| 180° | .340 | | 8.50% | 90° |

FIG. 25

FIG. 27
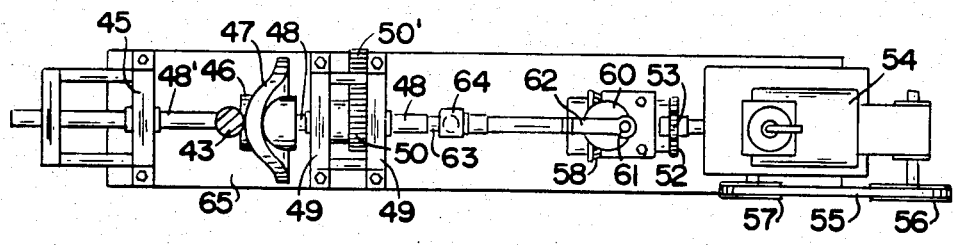
FIG. 28
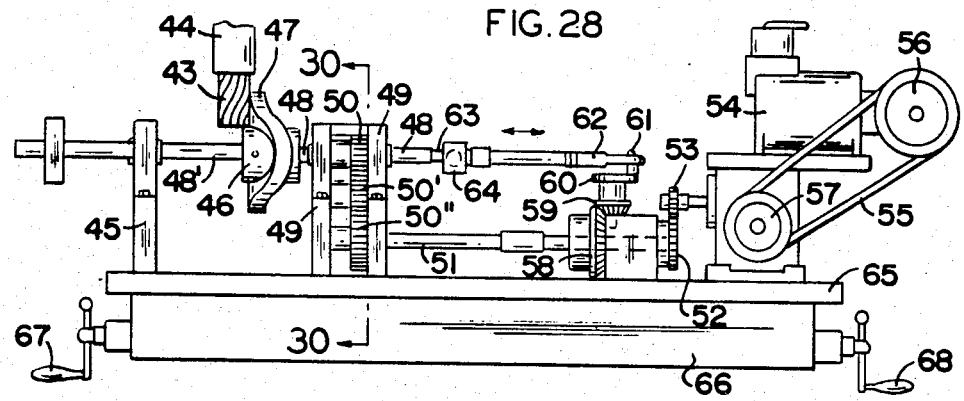
FIG. 29
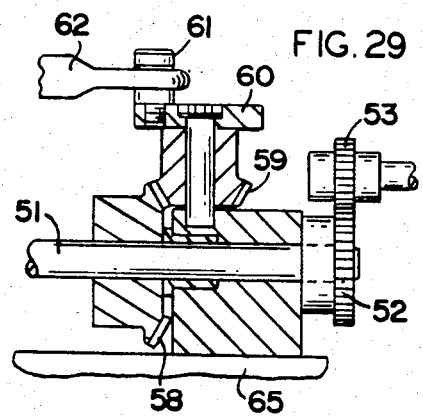
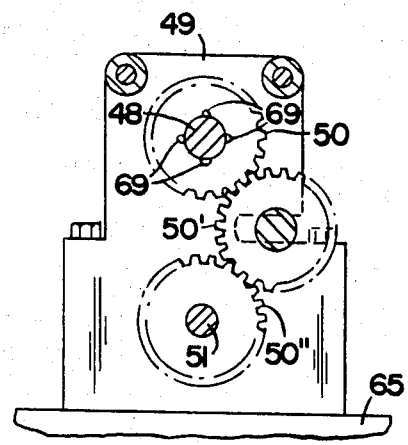
FIG. 30
FIG. 31
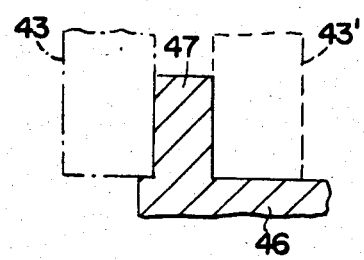

APPARATUS FOR PRODUCING A CAM WITH SINUSOIDAL CAM LOBE SURFACES

This application is a continuation-in-part of application Ser. No. 582,263, filed Feb. 22, 1984, now abandoned which is a continuation-in-part of application Ser. No. 420,390, filed Sept. 20, 1982, now abandoned which is a division of application Ser. No. 320,213 filed Nov. 12, 1981 now U.S. Pat. No. 4,432,310 issued Feb. 21, 1984, which is a continuation of application Ser. No. 265,259 filed May 19, 1981, now abandoned, which in turn is a continuation of application Ser. No. 35,553 filed May 3, 1979, now abandoned.

BACKGROUND OF THE INVENTION

1. Field of the Invention

This invention relates to a new type cam suitable for use in a parallel piston engine. More specifically the cam is adapted to fit into a circular arrangement of pistons and cylinders around a mainshaft, which pistons act in concert to effect rotation of the mainshaft by virtue of pressure exerted on the sinusoidal surfaces of the cam lobe encircling the mainshaft. Still more specifically the cam surface is specially designed to avoid friction and binding between the bearings and cam surface.

2. State of the Prior Art

Various types of engines for developing mechanical power, such as for propelling vehicles, have been proposed and are in use. The most commonly used is the internal combustion engine. However, in spite of their widespread use, there are a number of disadvantages in the types of engines used, namely vibration, low efficiency, pollution, etc.

Vibration is generally due to the type of arrangement of the pistons with relation to the drive shaft, which in combination with poor timing, unequal power distribution, etc., is very inefficient in eliminating vibration although much has been done in absorbing vibration or otherwise eliminating its transmission to the passenger-riding portion of an automobile.

Since rotary engines may have pistons equally spaced around the mainshaft through which power is transmitted, it is conceivable that such engines might have less problems with vibration.

A number of patents have been cited in parent applications. These include U.S. Pat. Nos. 1,197,896; 1,229,009; 1,351,365; 1,352,985; 1,487,338; 1,802,902; 1,867,504; 1,971,121; 2,027,076; 2,050,127; 2,237,621; 2,237,989; 2,243,817; 2,243,818; 2,243,819; 2,284,319; 2,966,899; 3,225,659; 3,456,630; 3,726,183; and 4,090,478; British Patent No. 251,607 (1926); French Pat. No. 861,625 (1939); Swiss Pat. No. 58,995 (1911); and German Patents Nos. 17,074 (1881) and 137,280 (1901). Some of these patents describe engines in which pistons are arranged parallel to a mainshaft which is driven by a cam rotated by the action of the pistons. However none of these have met with commercial success. The lack of commercial success of the engines shown in these patents is believed to be due to a number of defects therein in which the designs do not provide for centerline thrust between the pistons, bearings and cam surface and the cam surfaces are not designed to avoid friction and binding between the bearings and the cam surfaces. Some of these references describe methods of making sinusoidal cams by tracing or duplicating a master cam. The difficulties and problems of making an original or master cam are described by above cited U.S. Pat. No. 3,726,183. The method of making an original or master sinusoidal cam is described in pages 693-710 of the 21st edition of "Machinery's Handbook" published 1981 by Industrial Press Company of 200 Madison Avenue, New York, N.Y. 10157. As will be noted this is a complicated, cumbersome method.

SUMMARY OF THE INVENTION

In accordance with the present invention, a parallel cylinder engine using the cam of this invention operates with excellent fuel efficiency, little or no vibration, a minimum of exhaust pollution and a reduction of friction and freedom of binding between bearings and cam surfaces. This engine has multiple pistons and cylinders arranged parallel to and in a circle around a mainshaft. The pistons and cylinders are arranged in pairs, each pair having a common axis with a connecting rod connecting the two pistons. In a 2-cycle engine, one of the pistons in the pair goes through a firing cycle while its partner goes through a compression cycle and the two operate sequentially to drive the connecting rod back and forth along the common axis of the two cylinders.

In a preferred modification, each connecting rod has attached to it a pair of roller bearings each of which alternately presses and rides against a cam lobe encircling the mainshaft, as shown in U.S. Pat. No. 4,432,310.

In this preferred modification, this cam lobe has two sinusoidal surfaces each having two symmetrically disposed high points or rises, and 90° from these high points there are corresponding low points or reverse rises with curved portions connecting these respective points. In other words, this cam lobe has two rises or high points 180° from each other and 90° from each high point there is a corresponding low point or a high point in the opposite direction (reverse rise) with curved sections connecting adjacent high and low points. While the surfaces of the cam lobe are sinusoidal, they are not parallel to each other since the thickness of the cam lobe varies between the rises as explained in greater detail hereinafter. Moreover, as explained hereinafter, the sinusoidal curves differ in slope from the outer edge of the cam surface bearing-contact area as compared to the inner edge of the cam surface bearing-contact area, and also with respect to the center of the bearing-contact area, as explained hereinafter.

When a connecting rod moves in one direction in the path of its linear axis, one of the bearings carried by this connecting rod presses on the curved surface between a high and low point on the cam lobe, and by vector force, causes rotation of the mainshaft. In the automotive industry, a stroke of the piston or rod from one extreme position to its extreme position in the opposite direction is known as a stroke or cycle. Thus in going through intake, compression, power and exhaust, the piston and connecting rod goes through four strokes or cycles. With an engine having eight pairs of cylinders and pistons or 16 individual cylinders and pistons, there are 16 firings per revolution of the shaft which translates to 4 cycles per piston in one revolution of the mainshaft, and which results in a very smooth power transmission to the shaft with little or no vibration and with high efficiency.

An important feature of an engine using this cam is that the cam surface is designed to compensate for the friction and binding that results when a cylindrical bearing is rotated on a surface while the axis of the bearing is maintained in a position with its axis projected at a 90° angle to the axis of the mainshaft. Thus the outer edge of the bearing travels a path on the cam surface which has a greater circumferential distance than the path traveled by the inner edge of the bearing. However, since the two edges are on the same cylindrical surface, points on the outer edge must travel the same distance as respective points on the inner edge. Therefore, in view of these differences in the circumferential paths of the two edges on the cam surface, friction and binding develops as the bearing is rotated. The cam of this invention has a novel surface design which compensates for this difference and by a "ratio compensation" design of this surface, avoids the friction and binding which otherwise develops. In this design, the centerline of the area of contact of the cam with a bearing is a sinusoidal curve whereas the lines of contact of the cam with the outer edge and inner edge of the bearing define lines respectively which are also sinusoidal curves but different from the centerline sinusoidal curve in that the outer sinusoidal curve has a lesser slope and the inner sinusoidal curve has a steeper slope relative to the centerline sinusoidal curve. This arrangement compensates by equalizing the ratio of the travel distance of the inner and outer edges of the bearing.

In addition to the novel design of this engine, the cam itself is considered novel as well as the process and apparatus described hereinafter for its production. Moreover, with the engine of this invention there are a number of other important advantages, First, as stated above, there are 16 firings per revolution of the mainshaft with four cycles or strokes for each piston whereas with the present 8 cylinder engine, there are only two cycles per revolution of the crankshaft.

Second, the distance of the contact point of the connecting rod bearing with the cam lobe to the axis of the mainshaft exceeds the stroke of the piston thereby giving improved leverage and requiring less power to turn the mainshaft as compared to present engines.

Third, because of the higher number of cylinder firings permitted per revolution, this new engine design can use a lower compression ratio. Consequently, low octane fuel may be used efficiently. Moreover, a higher air ratio or leaner mixture can be used thereby resulting in more efficient use of fuel.

Fourth, since the engine is more compact in design, the size and weight of the engine may be very much smaller as compared to the present engines. For example, for comparable power production, this engine will weigh one-fourth less than the standard present engines.

Fifth, the engine design lends itself to the use of various fuels such as gasoline, diesel fuel and is even adaptable to the use of steam.

Sixth, the engine can be air-cooled, in which case blades may be attached to the mainshaft to propel air through cooling fins or other suitable means.

Seventh, the cam plate design of this new engine permits increased travel for the lifter cam and thereby decreases the amount of spring pressure needed for valve closing and gives infinite variations in valve operation, including duration of lifts, etc.

Moreover, other advantages will become obvious upon detailed description of the invention.

BRIEF DESCRIPTION OF THE DRAWINGS

The description of the engine of this invention is facilitated by reference to the drawings in which:

FIG. 1' is an enlarged isolated view of a piston of FIG. 1.

FIG. 9 is a top view of a bearing superimposed on a cam at angles of 40°, 45° and 50°.

FIGS. 10 and 11 are other views similar to FIG. 9 in which the positions of line AC are at angles of 90° and 135° C. respectively.

FIG. 12 is an enlarged top view of a bearing superimposed on a portion of a cam.

FIG. 13 is an enlarged top view showing the distances that center of a bearing travels at various angles.

FIG. 14 is a triangular representation of lines shown in FIGS. 12 and 13.

FIG. 15 is a planar representation of the distances travelled in a stroke.

FIGS. 16, 17 and 18 are representations of the contact points of a bearing with the cam at the outside, middle and inside of the bearing.

FIG. 25 is a chart comparing operation of a crankshaft engine with an engine using a preferred cam of this invention.

FIG. 26 is another representation of the truncated substantially trapezoid construction shown as FIGS. 22c and 22a.

FIG. 27 is a top view of apparatus designed to machine cams of this invention.

FIG. 28 is a side elevational view of this same apparatus shown in FIG. 27.

FIG. 29 is a side elevational view of a portion of FIG. 28 showing gear arrangement.

FIG. 30 is a cross-sectional view taken a line 30—30 of FIG. 28.

FIG. 31 is a cross-sectional view of a cam lobe showing an arrangement of cutting tools for cutting both sides of a cam lobe.

Figure 1:
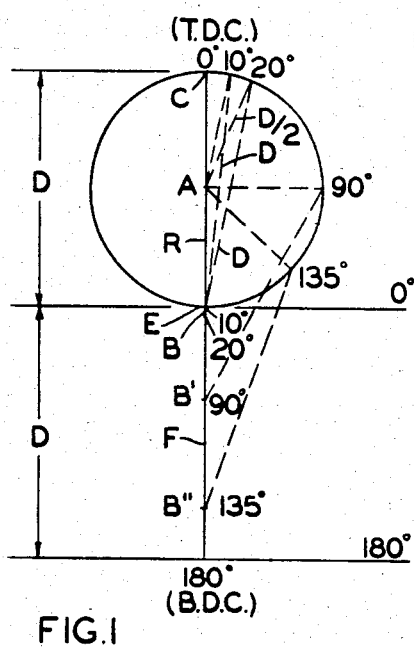
FIG. 1 represents a diagram used for making calculations pertinent to the diagram of the cam of this invention.
Figure 1:
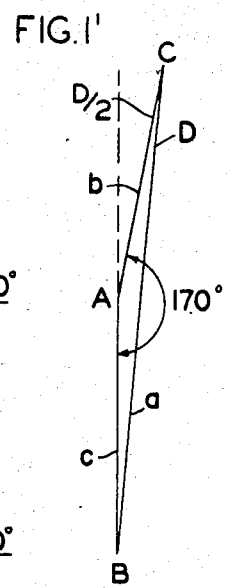

In such an engine using this cam the centerlines of the pistons and the centerlines of the connecting rods between pistons travel in lines parallel to the axis or centerline of the mainshaft. It is important, in order to avoid vector forces that will give a sideward thrust, that the line of contact points of a bearing against the cam embraces the centerline of a pair of pistons and that the direction of force applied by the bearing against the cam preferably substantially coincides with the centerline of said pair of pistons so as to impart "centerline thrust".

Each of the bearings attached to the connecting rods is maintained in a position so that its axial centerline is pointed in such a direction that the imaginary extension of this centerline intersects the axis centerline of the mainshaft at a 90° angle. This positioning of the bearing is effected by having a portion of the connecting rod slide in a groove which prevents the connecting rod, as well as the pistons connected thereto, from rotating or revolving on their respective centerlines or axes. This gives the effect of having the bearing rotate on an imaginary axle which extends to and at a 90° angle to the centerline of the mainshaft. Since the bearing travels upward and downward on the rises and valleys of the cam, this imaginary axle slides up and down on the mainshaft centerline to maintain its 90° angle therewith.

Imagine that the bearing travels on a flat cam surface and rotates on its imaginary axle, the contact points of the bearing comprise a straight line parallel to the axis or centerline of the cylindrical bearing. As the bearing thereafter rotates, each point of that straight line travels the same distance for each revolution of the bearing. However, the radius $R'$ from the centerline of the mainshaft to the outermost point on that line or the outer edge of the bearing is greater than the radius $R''$ from the innermost point on that line or the inner edge of the bearing. This difference in radii comprises the width W of the bearing. Consequently, as the bearing is rotated on its imaginary axle, the circumference of the path of the outermost point on the cam surface has a relationship to $2\pi R'$ and the circumference of the path at the innermost point on the cam surface has a relationship to $2\pi R''$. However, as discussed above, the radius of the circumferential path of the innermost point is shorter than the radius of the circumferential path of the outermost point by the width of the bearing, or in other words, $R''=R'-W$. Therefore, the innermost point travels a shorter circumferential distance by the amount of $2\pi R' - 2\pi(R'-W)$, or $2\pi R' - 2\pi R' + 2\pi W$, or $2\pi W$ than the circumferential distance traveled by the corresponding outermost point.

Next imagine that the cam surface instead of being flat is a sinusoidal surface in which the slopes of the indentations of the sinusoidal curves of the innermost and outermost circumferences of the bearing path correspond in slope to that of the sinusoidal curve in the center of the bearing path. In other words, a plane projected from the axis of the mainshaft to any outermost point on the cam will give cross-sections showing the bearing contact area of the cam having the same thickness of cam at the innermost, center and outermost points. The rises and reverse rises will have thicker cam sections than the intermediate sections between rise and reverse rise but the thicknesses at a particular cross-section will be uniform whether the cross-section is at a rise, reverse rise or any intermediate position.

As a bearing travels on such a sinusoidal cam surface, the same principle applies as to the circumferential distances traveled. Thus the path on the cam surface traveled by the innermost edge of the bearing is considerably shorter than the path on the cam surface traveled by the outermost edge of the bearing.

Therefore, since each point on the straight line of contact points described above rotates the same distance for each revolution of the cylindrical bearing, the outer edge of the bearing must travel a greater circumferential distance than the innermost edge of the bearing thereby resulting in friction and binding between the bearing and the cam.

In some of the prior art patents cited above, the bearings are designed in conical shape to compensate for these differences in circumferential distances that the outer and inner edges must travel. However this method of compensation produces vector forces giving an undesirable outward thrust to the connecting rods and to the pistons.

At each of the rises and reverse rises of the cam of this invention the points of contact of the bearing with the cam comprise a straight line as described above. Between a rise and a reverse rise there needs to be a compensation for the greater distance that the outermost point of the bearing travels compared to the shorter distance that the innermost point of the bearing travels.

In the cam of this invention, the centerline of the contact path between the bearing and the cam is referred to as the centerline sinusoidal curve. The intersection of this sinusoidal curve with the straight line of contact points of the bearing with the cam at the respective rises and reverse rises is consistent throughout the rotation of the bearing. However, between the rises and reverse rises, there needs to be an adjustment of the line of contact points on the cylindrical surface of the bearing. As the bearing moves away from a rise, there is a gradual variation in the line of contact points to spirals increasing gradually in variance from the straight line of contact so that as the bearing reaches the midpoint between the rise and reverse rise, the points of contact from its widest spiral line deviation on the surface of the cylindrical bearing with the outermost point on this spiral line being either right or left of a straight line on the cylindrical surface passing through the point of contact of the bearing with the center sinusoidal curve and the innermost point of the spiral of contact points is either left or right of said straight line. In other words, the outermost point and the innermost point are on opposite sides of this straight line. The factor determining whether the outermost point is to the right or left of said centerline is whether the bearing is moving up or down the rise, and whether the movement of the cam is clockwise or counterclockwise around the mainshaft.

Then as the bearing moves from this midpoint between the rise and reverse rise, this spiral line of contact points gradually reverses direction until at the time the bearing reaches the reverse rise, the contact points have reverted to a straight line.

As the bearing moves further going up from the reverse rise to the rise, another spiral contact line is formed with the positioning of the points being the reverse of where they were on the way down from the rise to the reverse rise. Again as the bearing passes the midpoint to the rise, the direction of contact points reverses so that gradually the spiral reverts to a straight line of contact points at the top of the rise. This variation of contact points from a straight line to a spiral and then back to a straight line compensates for the greater distance traveled by outermost points on the bearing as compared to innermost points on the bearing. This action is defined herein as "ratio compensation".

It is possible to calculate the cam surface design which will effect "ratio compensation" contact with the respective bearings. This can be done by translation of circular or crankshaft motion to straight line motion using distance or length D equivalent to the stroke or distance of travel of a piston. This method of calculation may be used for the outermost, center and innermost of the contact points on a bearing or any intermediate contact point. Generally the determination of the sinusoidal curves for the outermost and innermost contact points of a bearing with the cam are sufficient and intermediate contact points comprise a gradual transition from the outermost to the innermost points. The sinusoidal curve developed for the outermost contact points has a lesser slope between rise and reverse rise as compared to the sinusoidal curve for the innermost contact points. This difference permits the variations in contact at the innermost and outermost points as compared to each other and to the center points which effects ratio compensation so that between rises and reverse rises the contact points resemble a spiral on the cylindrical surface of the bearing but at the respective rises and reverse rises the contact points form a straight line on the cylindrical bearing parallel to the axis of the bearing.

BEST MODE FOR CARRYING OUT THE INVENTION

Figure 2:
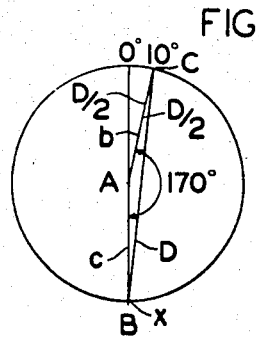
FIG. 2 represents a simplified version of the diagram of FIG. 1.

In FIG. 1 the stroke of the piston is represented as distance "D" which is also the distance from point 0° to point 180° on the circle. D also represents the diameter of the circle. FIG. 1' is an enlarged version of FIG. 1 but isolated on the lines for C having traveled 10° on the circle. FIG. 2 is also isolated on the 10° arc and shows the distance x that point B has traveled on line F. Point C is identified as the point of contact of line b with the circle and point B the point of contact of piston rod R with the circle at zero position. As the wheel or circle is rotated on its center A, the point of contact C moves in a circular path and point B moves downward along the path of line F until when point C has traveled 180° in its circular path, point B has traveled the distance D on its straight line path F. Points B' and B" show the intermediate positions of B at 90° and 135° respectively.

In having a bearing travel from one rise to an adjacent reverse rise (such as from 0° to 90°), the piston travels a cycle or the stroke distance. Then with the bearing traveling to the next rise the piston has reversed to its original position and completed two cycles for one-half revolution of the cam. Therefore there are two cycles of piston movement for each one-half revolution of the cam and the piston travels 10° of its cycle for each 5° of cam revolution. In other words, a bearing covers 5° of the cam for each 10° by the piston. Therefore the distance x which is the vertical distance traveled in 10° of arc of travel will also be the vertical distance a bearing will move in contact with the cam surface through 5° of cam revolution. Likewise, in 20° and 30° of point C movement, the vertical distance moved by the bearing in contact with the cam will be y and z, respectively.

For each 10° arc of travel (or other convenient arc) of the piston through its cycle, the distance for each position of C to the center A of the circle is the radius of the circle or D/2 and the distance from each position of C to the corresponding point of B on line F in each case is D or the stroke distance. The 10° and 20° positions are not shown according to scale but are exaggerated for clarity.

In FIG. 2, the 10° arc position is shown with the oblique triangle having D as its longest side, D/2 as its shortest side and the third side equal to D/2 plus the distance traveled by point B on line F of FIG. 1. The obtuse angle in this triangle is 180° − 10° or 170°. Knowing this angle and the lengths of two sides of the triangle, it is possible to calculate the length of the third side. The length of this third side of the triangle differs from D/2 by the distance that B has traveled on line F. This also corresponds to the vertical distance x that C has traveled in moving from 0° to 10° on its circular path.

Figure 3:
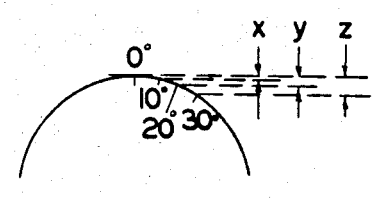
FIG. 3 is a diagram showing progressive vertical distances effected by progressive arc distances in FIG. 1.

Likewise when C has moved in its circular path 20° and 30° respectively, the total vertical distances moved by C will be y and z, respectively. Correspondingly, B will have moved these same vertical distances respectively along the path of line F. FIG. 3 shows in exaggerated scale how the point of contact point B will travel vertically on a cam surface traveling 10°, 20° and 30°, respectively.

Figure 4:
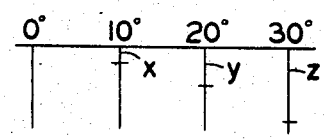
FIG. 4 is an enlarged diagram of a portion of FIG. 3.

The distances x, y, z, etc. shown in FIGS. 3 and 4 also represent the vertical distance that the point C has moved from its original zero position for each of the specific angles or arcs of movement. These also represent the positions of the center of a bearing as it moves the respective arc distances on the sinusoidal cam.

Figure 5:
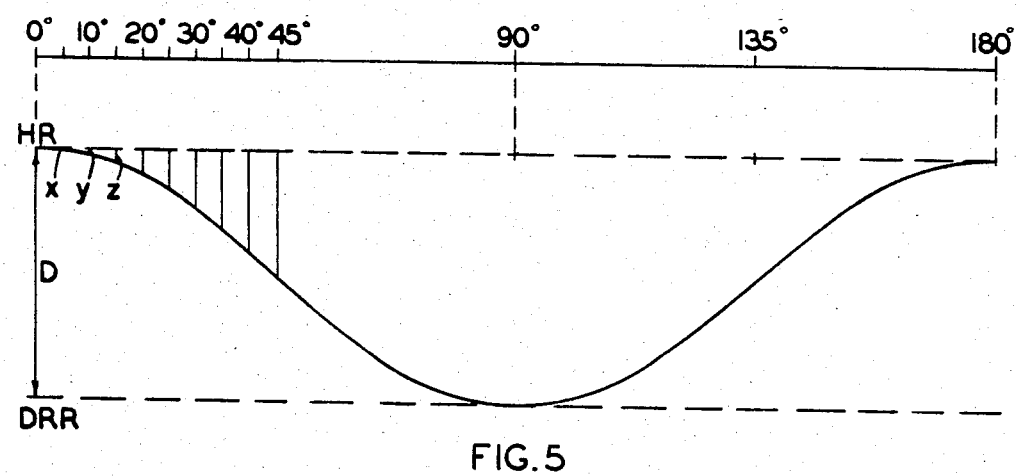
FIG. 5 is a diagram showing the application of the vertical distances of FIG. 3 as applied to a sinusoidal curve.

FIG. 5 represents a sinusoidal curve with HR representing the high rise positions and DRR representing the depth of the reverse rise positions. This is also a planar representation of a sinusoidal curve through 180°. Increments of 5° each are shown through the first 45°. With 5° of the cam corresponding to 10° of a piston cycle, the corresponding values of x, y, z, etc. may be plotted to give a sinusoidal curve which corresponds to the sinusoidal path of the center of a bearing traveling on the sinusoidal surface of a cam of this invention.

Figure 6:
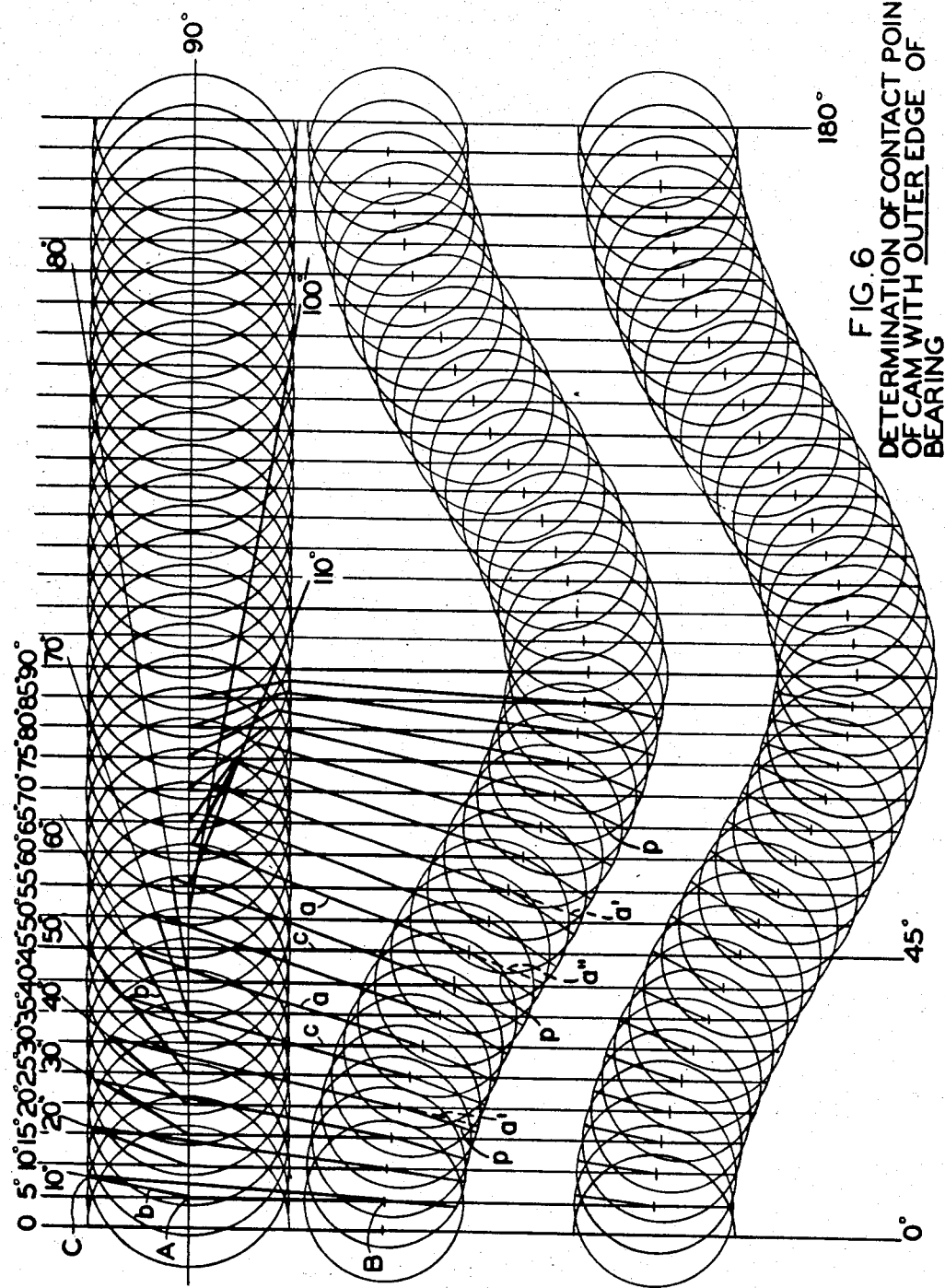
FIG. 6 represents a diagram method of applying progressively the data collected by the diagrams of FIGS. 1-5 to determine the configuration of the sinusoidal curve of a cam of this invention which is in contact with the outer edge of a bearing.

At the top of FIG. 6 a series of circles are drawn with the centers of each circle positioned on a horizontal line. The length of this horizontal line represents 180° of travel on the cam and also represents one-half the circumferential distance, in this case the outer circle of the cam or the contact points of the outer edge of a bearing with the upper cam surface. The positions of these circles are moved progressively 5° to the right for each 10° of movement of the piston which corresponds to 5° of movement on the cam. For each 10° of piston movement through its cycle, a diagram is drawn in accordance with that illustrated in FIGS. 1 and 2 to show the triangles formed by points or angles 1, and 3.

At 0° for both the piston cycle and the cam revolution, the center of the circle for the piston is on a vertical line extending downward from the 0° point and for convenience, the center of the circle representing the center (or axis of the bearing at the outer end or the end which is in contact with the outer edge of the cam) is positioned on this vertical line at a distance corresponding to line c which is the distance between points A and B. As the circles are moved progressively to the right on the horizontal line each successive 5° and the successive arcs for piston movement determined on each respective circle, the points C are determined and the point B (center of bearing) is moved down on the corresponding vertical line a distance equal to the vertical movement of C. In this manner a series of circles are drawn on the horizontal line and the positions of bearing centers are determined by drawing the respective triangles. A line drawn through these bearing center points form a sinusoidal curve and a series of circles are drawn in such sinusoidal curve, each circle having a radius corresponding to the radius of the cylindrical bearing.

Figures 7, 8:
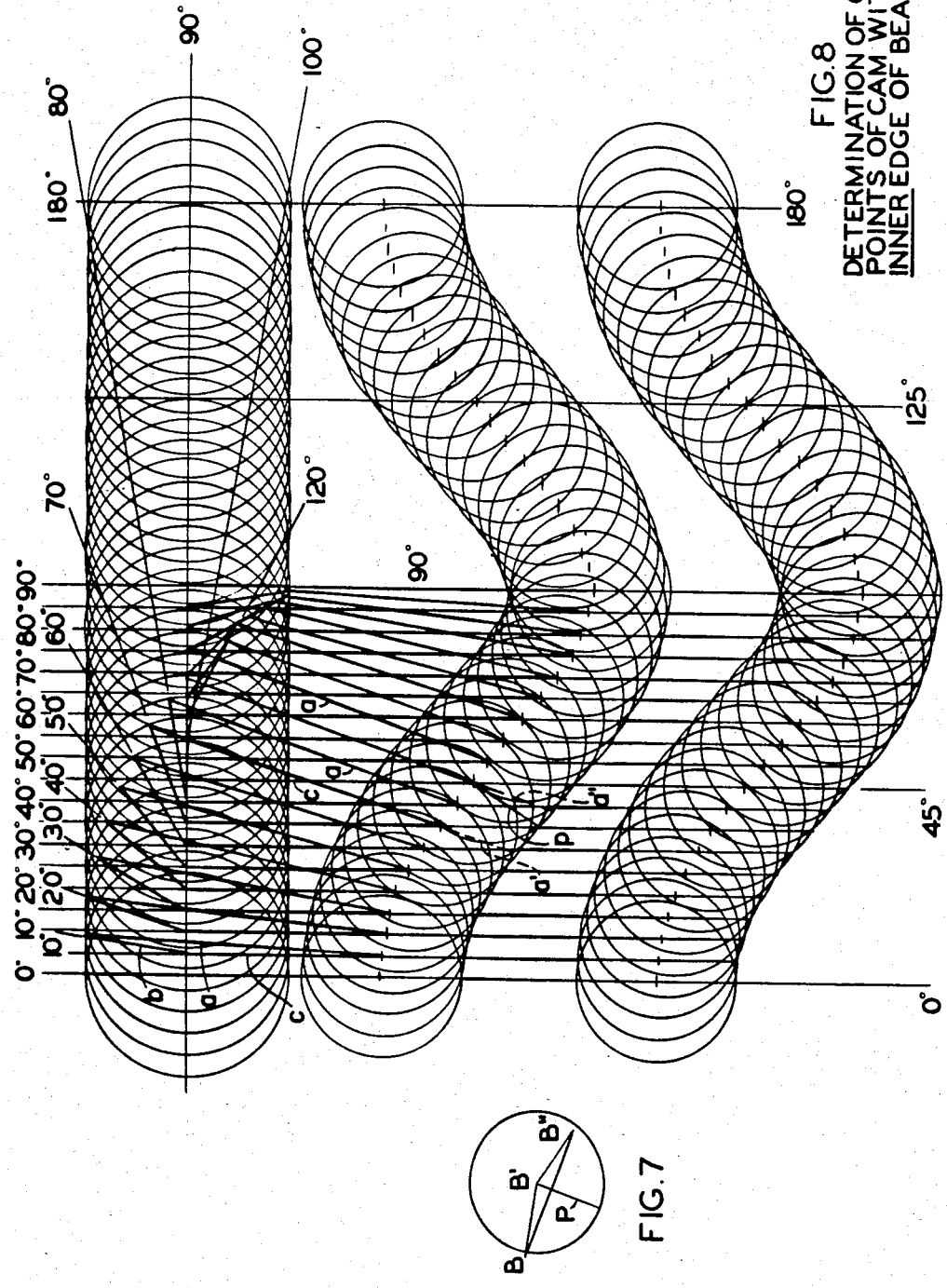
FIG. 7 is a diagram showing how a contact point of a bearing with the cam surface is determined.
FIG. 8 represents a similar diagram method as in FIG. 6 except that this is designed to determine the configuration of sinusoidal curve of the cam at those points which are in contact with the inner edge of a bearing.
Figure 19:
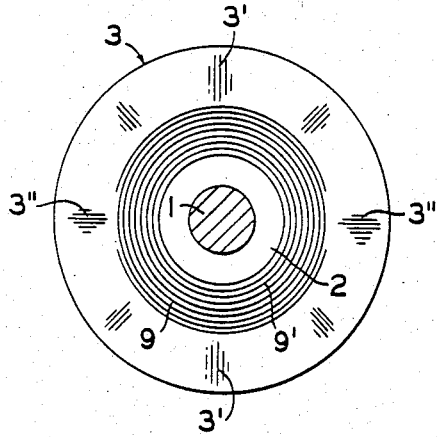
FIG. 19 is a front elevational view of the cam lobe and cam drum as attached to the mainshaft.

The contact point of each circle (in this case the outer edge of the bearing) with the cam is determined by drawing a triangle between three successive center points as shown in the enlarge exaggerated version shown in FIG. 7 where three successive center points are shown as B, B' and B''. The largest side of this triangle is the line between the 1st and 3rd points (B and B') and the two shorter sides are between the 1st and 2nd points (B and B') and between the 2nd and 3rd points (B' and B''). A line p is drawn from the 2nd point (B'), which is the center for the middle circle of the three, perpendicular to the longest side of the triangle (from B to B'') and extended to the circle. The circle shown in FIG. 7 is that which has B' as its center. The point of intersection of this line p with the circle is the point of contact of the bearing with the sinusoidal cam surface.

This procedure is repeated progressively for each successive combination of three circles to determine the tangent or point of contact of the successive circles (or positions of bearing) with the cam surface. These points of contact determine the contour of the cam surface against which the bearing will come in contact.

In the formation of the triangles described above, for determination of the centers of this second or lower series of circles (for positioning a bearing) the side "a" runs from the end of a piston arc to the center of a corresponding circle in this second series of circles. An arc of travel on the cam circumference is indicated by the 5°, 10°, 15°, etc. degree markings at the respective vertical lines and the ends of arcs traveled in a piston cycle indicated by lines marked 10°, 20°, 30°, etc. extending from the appropriate point on the corresponding circle. These respective points 10°, 20°, 30°, etc. represent point C in the respective triangles of FIGS. 1 and 2. The line a drawn from C to B is extended as shown by dotted line a'.

For the circles having piston arcs of 0° and 90°, there is no line a' since it coincides with the vertical centerlines. However as the piston arcs increase from 10° through 90°, the space between a dotted line a' and the closest line used to determine the cam contact point increases progressively until a maximum space is reached at 45° where a'' is substituted for a'. This maximum space means that the contact point of the outer circle of the bearing is at a maximum variant from where it is at 0°. Then in progressing from piston cycle arcs of 45° to 90°, the space defined between a' and the contact-determining line decreases gradually to where at 90° the dotted line a' coincides with the vertical centerline.

Although these a' lines are not projected in each case through completion of the piston cycle, the space between the a' line and the contact-determining line p increases from 90° to maximum at 135° and then decreases gradually from a maximum at 135'' to zero space at 180''. This gradual increase in these spaces and then gradual decrease in these spaces represent the "ratio compensation" mentioned above.

Below the above-described second series of circles, there is shown in FIG. 6 a third series of circles which are similarly projected from a horizontal row of circles (not shown) which are positioned further below the third series of circles and are projections from the opposite piston joined by a connecting rod and acting in unison with the piston for which projections have been described above. The contact points of the second series of circles with the cam surface determine the contour of the upper surface of the cam at its outer edge and the contact points of the third series of circles with the cam surface determine the contour of the under surface of the cam at its outer edge.

It will be noted that the cam is thickest at the 0°, 90° and 180° points of the cam and thinnest at the 45° and 135° points. It will also be noted that the contact points for the circles (or bearing positions) at 45° on the cam are on opposite sides of the 45° vertical centerline. Since the space between two bearings on the same connecting rod remains constant, this means that the thickness of the cam at 45°, 135°, 215° and 315° positions must be correspondingly thinner than the cam at its 0°, 90°, 180° and 270° positions.

FIG. 8 shows similar series of circles developed as in FIG. 6 except that these are for the inner edges of the respective bearings. The horizontal line of centers for the first or top series of circles is scaled for 180° of the circular configuration of the cam taken at the contact points of the inner edge of the bearing with the cam surface. The second or middle series of circles is developed as in FIG. 6 to determine the center points of the upper bearing at various progressive points in the bearing's travel at 5° increments over the cam with the contact points of the inner edge of this bearing on the cam surface determined in the manner described for FIG. 6.

Likewise, the third series of circles and the contact points of the lower bearing on the same connecting rod as for the said upper bearing are determined from a series of horizontally positioned circles (not shown) but also developed in the manner described as for FIG. 6 and the cam surface contact points developed as for FIG. 6.

It will be noted that the slopes of the sinusoidal curves of FIG. 8 are much steeper than for the corresponding curves of FIG. 6. This means that the curves from the rises to the reverse rises and vice versa are much steeper in this case.

At the 45° point on the cam, the triangle is shown for sides a, b and c with the extension of line a shown as dotted line a''. The line from the center of the corresponding circle in the second or middle series of circles to the contact point of that circle (or inner bearing edge) with the cam surface is also shown. It will be noted that the space (or angle) between a'' and the line determining this contact point is much greater than for the 45° position in FIG. 6.

Although the lines for the respective circles are not drawn in FIG. 8, they may be drawn to show progressive decrease in the space between the extension lines a (not shown) and the contact-determining lines as the circles move away from the maximum space or angle at the 45° position until they reach the minimum of 0 at the 0° and 90° positions. The maximums are again reached at the 135°, 225° and 315° positions and the minimums (or 0) again reached at 180°, 270° and 360° positions.

As described above, this design of the surfaces of the cam of this invention permit full contact as each bearing travels on its circumferential path on the cam and by the spiraling contact described above and its ratio compensation for the inner and outer areas of the bearing as effected by the varying slopes of the sinusoidal surfaces of the cam, the bearings effect rotation of the cam and the mainshaft without the friction that accompanies the use of a sinusoidal cam that has uniform thicknesses in the inner and outer portions of the cam.

In accordance with FIG. 1, for an arc of 45° angle A is equal to 180°−45° or 135°. For a stroke of 1.900 inches, line a of FIG. 1 has a length of 1.900" and b=D/2 or 0.950. Using the equation Sine B/b=Sine A/a or Sine B/0.950=Sine 135°/1.9; Sine B=Sine 135°×2; angle B is determined, and angle C is determined as equal to 180—the sum of angles A and B. Distance C is determined by the formula c/a=sine C/sine A or c/1.9=sine C/sine 135°. The length of travel of the piston from the top dead center point (T.D.C.) to the 45° angle is equal to the difference between c and the radius or c−0.950.

As discussed above with regard to FIG. 1, the maximum piston travel distance is identified as D which, in this case, is also the diameter of the circle traveled by point C. The contact point of the bearing with the cam face may be calculated for the various arcs of travel of point C as described below in connection with FIGS. 12-18.

In FIG. 1, the 0° point is the top dead center point (T.D.C.) and the 180° point is the bottom dead center point (B.D.C.) of the piston stroke or the connection point of the connecting rod with the bearing center. The intermediate positions of this connecting point or bearing center are determined as described for FIGS. 6 and 8. With the bearing center remaining on the centerline of the piston and of the connecting rod, the bearing rises and falls with the upward and downward movement of the piston and connecting rod. This upward and downward movement of the bearing causes pressure on the cam surface resulting in rotation of the cam.

To determine the actual contact points of the bearing with the cam surface a number of calculations may be made as described for the determination of line p in FIGS. 6 and 7. This is also illustrated below in FIGS. 13,14,16,17 and 18.

FIGS. 9, 10 and 11 illustrate the determination of the location for points A, B and C and the resultant triangles for angles 45°, 90° and 135°. FIG. 9 shows by dotted lines variations in the respective triangles for 5° less and greater than the 45°, namely 40° and 50°, as developed more fully below in connection with FIGS. 12, 13 and 14.

In FIG. 12 a bearing L is shown superimposed on cam J. While the bearing actually remains in the same position except to move up and down vertically, and the cam rotates below or above a particular bearing, this is a matter of relativity and the bearing is depicted here at a 45° angle on the cam. Radial dotted lines are shown for 40°, 45° and 50°. The outer edge of the bearing is identified as 0, the midpoint of the bearing cylindrical surface as M and the inner edge of the bearing as I. The intercept points of the radial lines for 40°, 45° and 50° are identified as O′, O″ and O‴ respectively. The vertical distance between O′ and O″ is identified as $x'$ and that between O″ and O‴ as $x''$. The $x'$ and $x''$ distances also represent distances on the vertical line between 0° and 180° of FIG. 1 that the center of the bearing will travel when the piston and connecting rod connecting point to the bearing has traveled from 40° to 45° and 45° to 50° of the stroke distance.

Since the lengths of these 5° arcs are relatively short, they are approximately equal to a straight line between the respective points. The arc distances may be calculated as 5/360 or 1/72 of the appropriate circumference which is $2\pi R$ where R is the radius of the respective circles for the line of contact of the outer edge, middle and inner edge respectively of the bearing with the cam surface. While the cam surface is actually sinusoidal, the circle referred to is considered as one produced by having the contact point of the bearing rotate on a flat surface with the center of rotation being the axis of the cam or the cam shaft. It may also be considered as the outer surface of a cylinder on which the contact points of the particular part of the bearing with the cam surface will be included.

FIG. 13 shows the various distances that the center of a bearing travels (on the vertical 45° line) from 0° to the full stroke at 180° including the various intermediate distances at 40°, 45° and 50°. The vertical distances between the 40° and 45° points and between the 45° and 50° points are identified as $x'$ and $x''$ as also described above. The overall vertical distance from 0° to 40° is identified as $y'$; from 0° to 45° as $y''$; and from 0° to 50° as $y'''$. A triangle is defined in the center of FIG. 13 by the horizontal 40° line running from the 40° vertical line to the 50° vertical line; a vertical section on the 50° vertical line running from the 40° horizontal line to the 50° horizontal line; and the hypotenus connects the two unattached ends of the said horizontal and vertical sides. A line is drawn perpendicular to this hypotenus at its intersection with the vertical 45° line. This perpendicular line forms an angle P with the said vertical 45° line and this angle corresponds to the angle P formed between the horizontal 40° line and the said hypotenus. This same triangle is shown in enlarged form in FIG. 14.

In FIG. 14 the length of line O′ and O″ is the 5° arc length of FIGS. 12 and 13 and the length of line O″-O‴ is also a 5° arc length so that triangle side O′-O‴ is twice the 5° arc length. The vertical side of the triangle is equal to $x'$ plus $x''$. Therefore the value of angle P is determined from the equation:

Tangent of $P = (x' + x'')/(\text{twice the 5° arc length})$

Thus, as illustrated in FIGS. 15-18, where the stroke or a value is 1.900 inches, the radius or b value is 0.950, the bearing has a width of 0.5 inch and the radius from the center of the cam to the outer edge of the bearing is 3.5 inches, the respective 5° arc lengths are calculated to be 0.1525 at the contact line for the outer edge of the bearing, 0.1416 at the contact line for the middle of the bearing and 0.1307 at the contact line for the inner edge of the bearing. The angle P is 13°04′16″ for the outside, 14°05′02″ for the middle and 15°16′26″ for the inside, with x′+x″ value being 0.71 inch in each case.

This determination of angle P makes it possible to determine also the contact points of the bearing with the cam surface. Thus in FIGS. 16, 17 and 18 the points of contact are identified as X, Y and Z respectively for the outside edge of the bearing, the middle of the bearing and the inner edge of the bearing. Using the respective different circumferences for these outside, middle and inner circles, it is possible as described above to determine the value of angle P in each case, and then the distances for X, Y and Z from the 45° line as shown in FIGS. 16, 17 and 18. Thus, as shown in FIGS. 16, 17 and 18 the contact points of the bearing are 0.170 inch from the 45° line for X (the outer edge of the bearing), 0.1825 inch for Y (the middle of the bearing) and 0.198 inch for Z (the inner edge of the bearing. These differences or variances in the distance of these various contact points from the 45° line confirm the fact the contact points on the bearing surface form a spiral line at the 45° point of the cam as compared to the straight line contact effected at the 0°, 90°, 180°, 270° and 360° points of the cam. Between the maximum variance at the 45°, 135°, 225° and 315° points and the adjacent straight line of contact points there is a gradual change from one to the other and the exact contact points for various angles of the cam may be calculated as described above.

The ratio 0.198/0.170 or 1.1655/1 is the compensation that must be accommodated between the outer and inner edges of the bearing because of the differences in respective circle circumferences that the outer and inner edge must travel in its travel over the sinusoidal cam (or the sinusoidal cam under or over the bearing). This ratio compensation is effected by the type of cam surface described herein. This same ratio may be calculated from the respective circumferences namely 21.966/18.824 or 1.1655/1.

In order to design an appropriate cam lobe it is necessary to have certain information or dimensions predetermined, such as the diameter of the bearings to be used on the cam lobe, the stroke of the piston (or the distance through which the bearings will be pushed by the piston) and possibly the thickness of the cam lobe at the rise or reverse rise of the lobe. The thickness of the cam lobe at this point should be limited substantially to the distance between the closest points of the two bearings that are in contact with the cam lobe and at opposite sides of the cam lobe, with a minimum amount allowed for clearance.

Obviously the farther the contact points are from the axis of the mainshaft, the greater will be the leverage for turning the mainshaft. Since the cam lobe needs to be only wide enough to permit contact of the bearings with it, the cam drum may be big enough to occupy most of the space between the mainshaft and the bearing contact area on the cam lobe.

A primary requirement is that there is always one bearing of a pair in contact with one of the cam lobe surfaces. The other bearing of the pair may be in contact with the opposite cam lobe surface but preferably may have a clearance of about 0.002 inch or more. When there is a variation from the ideal design described above there may be considerably less thickness in the cam lobe between rise and reverse rise, in which case there will be more clearance of the second bearing during its non-contacting movement.

When the two opposing bearings reach a rise or a reverse rise, there will be a changeover in the contact of the bearings. For example, the bearing in contact with the lobe surface as it moves down from the top of the rise to the dip or reverse rise after passing the thickest part of the lobe becomes the bearing out of contact with the lobe surface, depending on the clearance, and the other bearing becomes the one in contact with the lobe surface until the next rise is reached. While it is preferred that there is at least about 0.002 inch clearance for the non-contacting bearing, it is possible with an ideally designed lobe that both bearings are in contact with the adjacent lobe surfaces allowing for lubricant and operating engine heat expansion.

Figure 21:
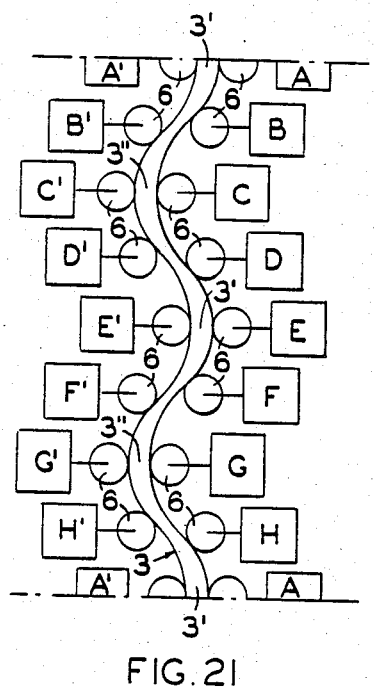
FIG. 21 is a schematic view in which the peripheral view of the cylinders, pistons, connecting rod, bearing and cam lobe has been flattened into a single plane.
Figure 20:
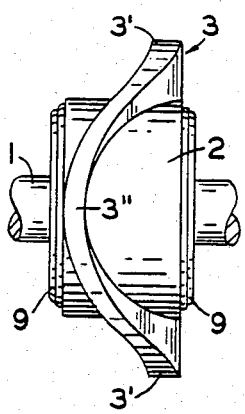
FIG. 20 is a side elevational view of the cam lobe, cam drum and a portion of the mainshaft which are shown in FIG. 19.

For the engine described in U.S. Pat. No. 4,432,310, the schematic layout of FIG. 21 shows the relative positions of the various pistons at a particular instant. In this arrangement pistons A and E are at the top or crest of cam lobe rise 3′ and pistons C′ and G′ are at the top or crest of reverse cam lobe rise 3″. Each of these pistons is in a position for firing and as movement carries the bearings 6 off dead center of the cam lobe rises, the movement of the pistons, the connecting rods and the attached bearings will exert force against the cam lobe and thereby cause rotation of the mainshaft.

It will be noted that two cylinders are firing simultaneously, namely A and G′. At the same instant, cylinders B and H′ are halfway through the firing cycle. Cylinders C and A′ have completed their firing cycles and are ready to start their exaust cycle, and cylinders E and C′ have finished their exhaust cycle and are ready to start the intake cycle, cylinders G and E′ have finished their intake cycle and are ready to start the compression cycle. Cylinders H and B′ are halfway through their compression cycles.

Figure 22A:
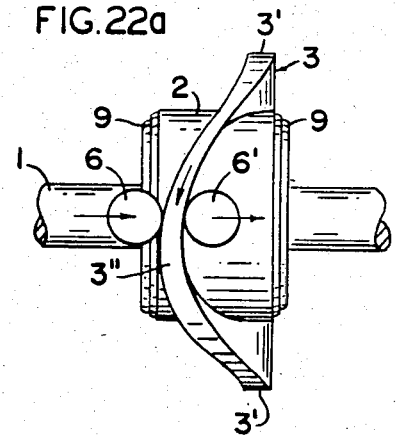
FIGS. 22a, 22b, 22c, 22d, 22e and 22f show side elevational views of the cam lobe and the positioning of the same pair of connecting rod bearings as they travel from a position adjacent to one high rise of the cam lobe in FIG. 22a to a low position in FIG. 22c and then adjacent to the opposite high rise as shown in FIG. 22f, during the course of half of a revolution of the mainshaft.
Figure 22B:
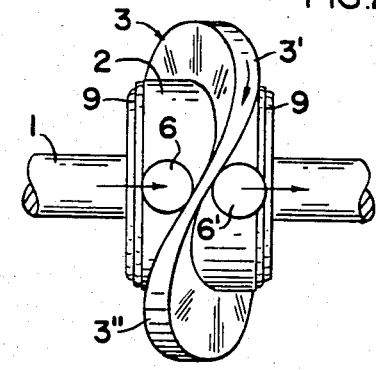
Figure 22C:
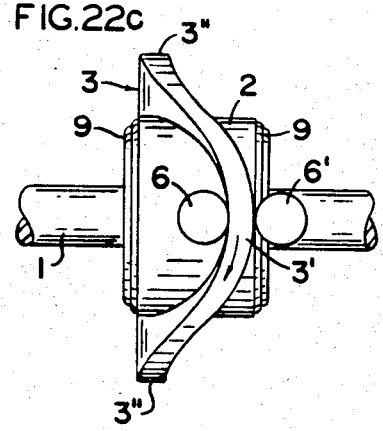
Figure 22D:
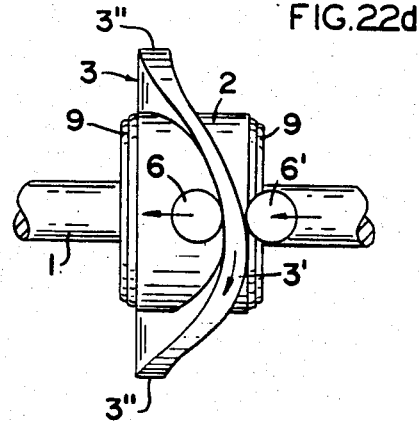
Figure 22E:
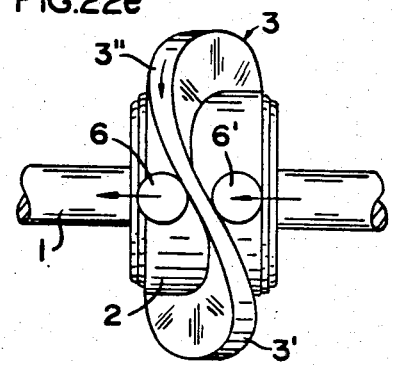
Figure 22F:
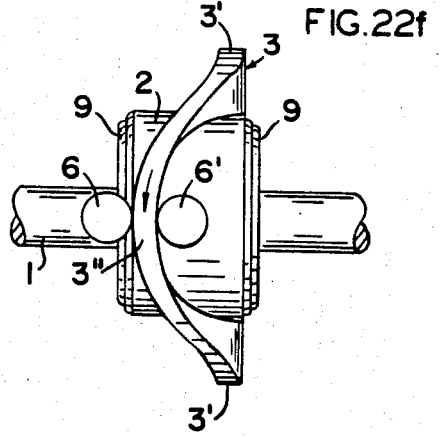

FIG. 22a shows the bearing 6 for piston PA positioned at the top of cam lobe rise 3″ just off dead center and ready to start downward thereby exerting force on the cam lobe which will cause mainshaft 1 to rotate. Bearing 6′ is under the cam lobe and has just completed its firing cycle travel for piston PA′ and is starting its exhaust cycle. FIG. 22b shows bearing 6 and bearing 6′ halfway down their paths with the cam lobe and mainshaft rotated part way. FIG. 22c shows the cam lobe and mainshaft rotated still farther and bearing 6 in its position at the end of the firing cycle for piston PA and bearing 6′ is in its final position for exhaust of cylinder A′. FIG. 22d shows bearing 6 starting its exhaust movement upward on the cam lobe and bearing 6′ is also starting upward in its intake movement for cylinder A′. FIG. 22e shows bearing 6 and bearing 6′ halfway in their upward movement for exhausting cylinder A and intake for cylinder A′ respectively. FIG. 22f shows bearing 6 at the top of the opposite rise 3″ for completing the exhaust movement of cylinder A and bearing 6′ at the top of its intake cycle for completing the intake movement of cylinder A′. FIG. 22a through 22f show the movement of bearings 6 and 6′ for one-half revolution of the mainshaft. In subsequent movements (not shown), bearing 6 goes through positions for intake and compression of cylinder A taking bearing 6 back to the position of 22a for completion of the cycle and one complete revolution of the mainshaft. In subsequent movements (not shown) of bearing 6″, it goes through the compression and firing cycles of cylinder A′ taking it also back to the position shown in FIG. 22a.

While the drawings described above are directed to 8 pairs or 16 individual pistons and cylinders, this engine may also be operated with lower or higher numbers of pistons and cylinders. For example, four or six pairs may be used as well as ten or twelve pairs or even higher with appropriate arrangement and timing to effect smooth and efficient operation.

FIGS. 23a through 23i represent cross-sections of the bearing-contact areas of the cam of this invention taken by planes each coinciding with the centerline of the mainshaft and taken at angles of 0°, 22.5°, 45°, 67.5°, 90°, 112.5°, 135°, 157.5° and 180° respectively, these angles being taken in a clockwise direction around the cam. The views shown in FIGS. 23a through 23i are taken with the cam being held so that the axis is in a vertical position. As shown in the respective sections of FIG. 23a through FIG. 23e, the cam positions gradually decrease in thickness from 0° to 45° and then increase gradually from 45° to 90° where the thickness reaches the same as for 0°. Similar decrease to 135° and then increase to 180° are shown in FIGS. 23f to 23i. Moreover, as the transition goes from 0° to 45°, the right side of the respective sections, which right sides are represented by dotted line since this side is the only side not an outer configuration of the cam lobe, actually extends into the cam. The end points of this dotted line are on the contact line of the inner edges of the bearings in contact with the cam lobe. These decrease in size at a greater rate than the left sides of the respective sections, which left sides represent the outer circumference of the cam lobe and the extremities of the left side line represent the line contacted by the outer edge of the bearings. The dimensions given on FIGS. 23a through 23i are actually dimensions for a cam lobe having a radius of 3.246 inches from the centerline of the bearing path (which also corresponds to the centerline of the piston or connecting rod) to the axis of the cam (as well as axis of the mainshaft). The centerline circumference is 20.985" and the outer and inner circumferences are 21.966" and 18.824" respectively. The bearing used has a 1.5 inch diameter and 0.5 inch width.

Figure 23A:
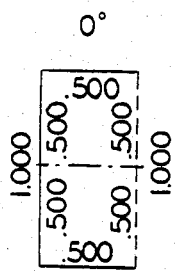
FIGS. 23a through 23i represent cross-sections of the bearing-contact portion of the cam of this invention cut by planes coinciding with the centerline of the mainshaft and extending to the exterior of the cam at angles 0°, 22.5°, 45°, 67.5° and 90° respectively.
Figure 23B:
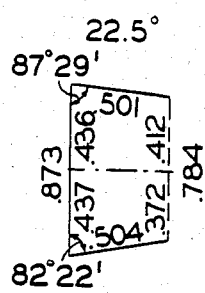
Figure 23C:
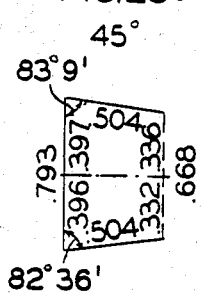
Figure 23D:
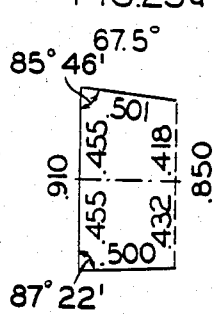
Figure 23E:
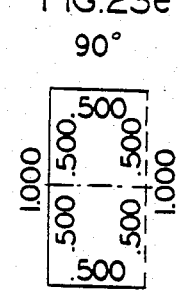
Figure 23F:
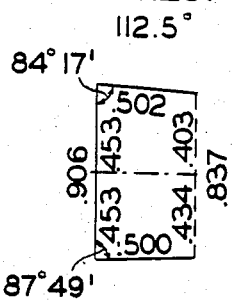
Figure 23G:
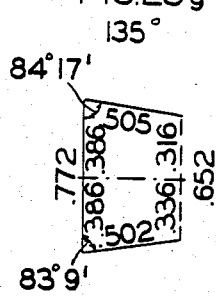
Figure 23H:
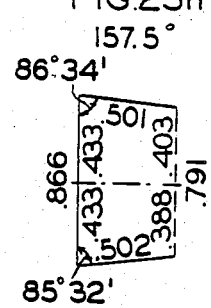
Figure 23I:
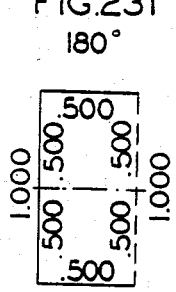
Figure 24A:
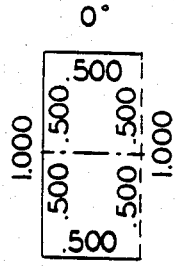
FIGS. 24a through 24i represent cross-sections of a cam cut as in FIGS. 24a through 24i having sinusoidal curves but not the ratio compensating features of the present invention.
Figure 24B:
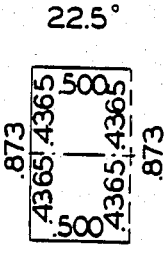
Figure 24C:
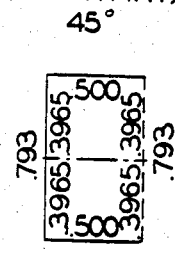
Figure 24D:
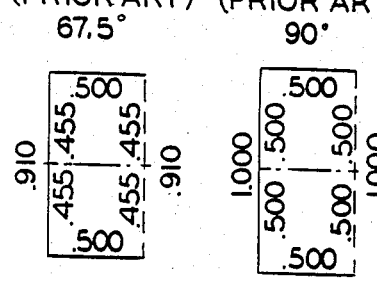
Figure 24E:
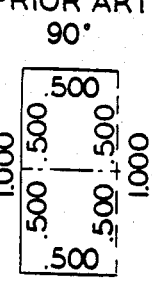
Figure 24F:
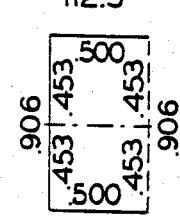
Figure 24G:
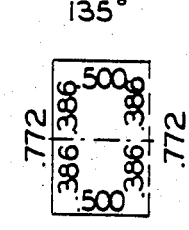
Figure 24H:
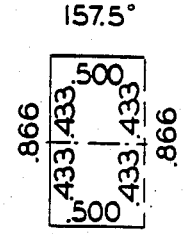
Figure 24I:
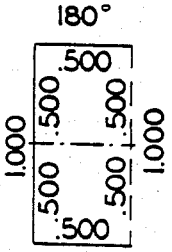

The rectangular configurations of FIGS. 23a, 23e and 23i represent the thickness of the contact bearing portions of the cam taken at 0°, 90°, 270° and 360° or in other words, at the respective rises and reverse rises of the cam of this invention. The respective intermediate sectional configurations of FIGS. 23b, 23c, 23d, 23f, 23g and 23h result from the steeper slope of the sinusoidal curve in contact with the inner edge of a bearing as compared to the lesser slope of the sinusoidal curve in contact with the outer edge of the bearing. The dimensions of the various lines shown in FIGS. 23a through 23i are calculated and the accuracy of these measurements is confirmed by cutting the cam in the planes indicated and measuring the respective dimensions.

FIGS. 24a through 24i show cross-sections at the areas corresponding to those of FIGS. 24a through 24i taken on a cam having sinusoidal surfaces of the type known in the prior art which do not have the ratio compensation feature of the present invention. In this series all of the cross-sections created by the respective planes used as FIGS. 23a through 23i at angles of 0°, 22.5°, 45°, etc., are rectangles with the right sides in each case having the same dimension as the left side. While the thickness of these sections decrease from 0° to a mininum at 45° and increase from the minimum at 45° to a maximum at 90°, the dimensions for the two sides are the same in the cross-section for a particular angle. These shapes and dimensions are consistent with the fact that the slopes of the sinusoidal surfaces are the same at the contact points of these surfaces with the inner and outer edges of the bearings.

Figure 26:
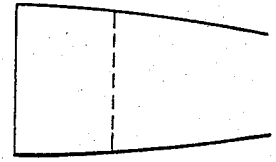

The truncated trapezoid shapes shown in FIGS. 23c and 23g are actually "substantially" trapezoidal in that the sloping sides of the trapezoids are slightly curved. This slight curvature is caused by the fact that the sinusoidal surfaces intersected by the plane described as causing these cross-sections are themselves slightly curved from the outermost region toward the inner area of this cam lobe. This slight curvature is depicted in FIG. 26, which is an extended view of the planar cross-sectional cut taken at 45°, whereas in FIGS. 23c and 23g the sides of the trapezoids are shown as straight lines. In the intermediate cross-sections between these and the rectangular cross-sections of FIGS. 23a, 23c and 23i the sides become more truly straight lines until they eventually form the sides of the rectangles shown in FIGS. 23a, 23e and 23i.

The chart of FIG. 25 shows how the preferred Waller cam, which is designed to duplicate the operation of a crankshaft, does so even though one revolution of the cam effects the same operation as two revolutions of the crankshaft. Crankshaft operation is designed to use the explosion and combustion in a cylinder at as close as possible to the highest compression part of the cycle. Preferably ignition is effected at about 6° before top dead center.

The various increments in the stroke with the crankshaft show that for a corresponding distance of stroke with the cam the crankshaft has travelled twice the number of degrees as for the cam. This duplication of crankshaft operation even though at different numbers of revolution is assured by having the manufacturing equipment for the cam designed to duplicate the variable speed of the crankshaft in the speed with which the advancement and retraction of the cam is effected in the cutting or grinding operation. This is effected by having a fixed hypotenuse in operating the said advancement and retraction which corresponds to the fixed hypotenuse, a piston arm, which drives the crankshaft.

The desire to duplicate crankshaft operation is based primarily on the fact that present cars have corresponding arrangements for values, combustion chamber design, intake and exhaust porting, etc. Therefore duplicating crankshaft operation with the cam of this invention simplifies conversion of automobiles to the engines operated with this cam.

This duplication of the crankshaft operation in the design of the preferred cam accounts for the variations in dimensions and angles of the cross-sections of FIG. 23. Where it is desired to have more symmetrical dimensions and angles this may be effected by using constant speed throughout the advancement and retraction of the cam in the cutting or grinding operation described below in connection with the apparatus of FIGS. 27-31 and the process for operation of the same.

While the arrangement of the cam drum with respect to the cam lobe and the mainshaft as shown in the drawings and as described above is preferred and is considered more practical and efficient, it is also contemplated that the cam drum may be omitted from its intermediate position between the mainshaft and the cam lobe. If desired, one or more cam drums may be attached to the mainshaft in a different location to provide harmonic balance and to provide support for the cam plates to be attached to the ends thereof, on which cam plates ridge risers may be located for actuating the valve lifters for the intake and exhaust operations.

Nevertheless the design shown in the drawings whereby the cam drum is intermediate between the cam lobe and the mainshaft is preferred since this location requires less space on the mainshaft and provides flywheel action and harmonic balance. Moreover, the cam drum may be solid or partially hollow in accordance with its size and its desired effect.

The cam described herein with specially designed sinusoidal surfaces of the cam lobe is considered to be novel per se. Prior art methods of making cams are similar to the method described in "Machinery's Handbook", pp. 693–710, 21st edition, published by The Industrial Press, New York, N.Y. There is no teaching in the prior art of the ratio compensation features described herein. There are described above methods for determining the exact shape or slope of the sinusoidal curves in various bearing-contact areas of cam or cam lobes.

There have also now been found a simple process and apparatus for producing cams having cam lobes with the sinusoidal surfaces having the ratio compensation features described above. The process and apparatus are based on the fact that a cutting tool or grinder having the same radius as the bearing to be used on such surfaces will act in the same manner with respect to straight line and spiral line contacts with corresponding variances, and will therefore cut the sinusoidal surfaces correspondingly.

In this process and apparatus a cutting tool or grinding wheel is selected having the same radius as the bearing which will be used against the cam surface. The cutting or grinding tool is held in a stationary position, for example, vertically, while being rotated and a cylindrical cam is advanced toward and retracted from the cutting or grinding tool while the cam is rotated on its axis which is positioned horizontally or at a 90° angle with the axis of the cutting or grinding tool. The rotation of the cam is correlated with the advancement of the cam toward the cutting or grinding tool so that the advancement and retraction will each occur twice during one revolution of the cam.

The gradual advancement and then retraction of the cam with respect to the cutting tool (or the grinding tool) eventually results in a smooth cutting of two reverse rises into the end of the cam. The apparatus holding the cam and the mechanism causing its rotation as well as its advancement and retraction are all positioned on a supporting structure that can be moved manually or mechanically in a horizontal direction, for example, by a threaded device. Since the cutting or grinding should be effected gradually, the movement of the supporting structure is effected gradually to accommodate the depth of each cut. Moreover the total sideward movement of the cam during its rotation corresponds to the depth of the reverse rise to be cut into the cam. At the sites of the two rises the cam is fully retracted so that there is little or no cutting at these exact positions. Then at the positions of the reverse rises the advancement is at its maximum.

Therefore initially the position of the supporting structure is such that the maximum advancement of the cam toward the cutting tool causes a small cutting at the reverse rise positions that will accommodate the capacity of the cutting tool. Then periodically the supporting structure is advanced incrementally in the direction of the cutting tool so that new cuts of the appropriate depth are made. Therefore as these incremental advancements are made the cutting at the reverse rise positions become deeper and deeper with corresponding increases in depth being made between the reverse rise and the adjacent rises.

When the appropriate depth has been effected in the reverse rises the cam may be reversed and positioned for cutting on the opposite side of the lobe with the reverse rises on this new side being registered directly opposite the rises on the first side or the cutting tool may be repositioned to the opposite side of the cam. Then the foregoing procedure is repeated to complete formation of the opposite sinusoidal curve. The distance between a rise on one side and the opposite reverse rise should correspond to the distance between bearings on a particular connecting rod plus a small amount, such as 0.002" to allow for clearance.

To save a considerable amount of cutting or grinding it is convenient to use a model, even one made of wood, and preferably made by the above techniques, to form a mold from which castings of the desired metal may be made. Then cutting or grinding may be effected on such a preformed casting to give the exact dimensions and shape desired.

In the top view shown in FIG. 27 and the side elevational view of FIG. 28, cutting tool 43 is actuated and supported by arm 44 extending downward from the driving machine (not shown). The cutting tool 43 is supported from above and positioned to the left (in this modification and also as shown in FIG. 28 of cam 46 on which cam lobe 47 is being cut. Cam 46 is supported by and rotated with tightly fitting shaft 48. Shaft 48 passes through an axial opening in the cam 46 and extends from housing 49 and identified on the other side as shaft 48' which is rotatably supported by supporting frame 45 through the shaft 48' is free to move horizontally in the same direction as cam 46. Inside housing 49 there are a series of gears 50, 50' and 50" which impart the desired rate of rotation to shaft 48 and thereby to cam 46 and cam lobe 47. Axle 51 drives the gear 50" which by appropriate gear ratios to gears 50' and 50 impart the desired rate of rotation. Shaft 51 is driven by gear 52 which in turn is driven by gear 53. Gear 53 is driven by electric motor 54 through pulley 55 and pulley wheels 56 and 57. The gear ratio between gears 53 and 52 are appropriate to translate the motor speed to the desired rate of rotation for gears 50, 50' and 50". Shaft 51 has gear wheel 58 attached thereto which meshes with gear wheel 59 which is rigidly fixed to wheel 60. Wheel 60 has a pin 61 extending therefrom to engage arm 62 which in turn is pivotally affixed to shaft 48 by pivotal connector 64 so that as wheel 60 is rotated, pin 61 effects a forward and backward motion of arm 62 and thereby through the ball joint 63 transmits forward and backward motion to shaft 48. Shaft 48 extends slidably through gear wheel 50 and by a spline arrangement is rotated thereby. Shaft 48 extends through an axial opening in cam 46 and by a tight fit effects a corresponding movement therewith to the left and then backward to the right. This backward and forward movement corresponds to the diameter of the circle described by pin 61 on wheel 60. The ratios of the various gears are such that there are two revolutions of wheel 60 per revolution of cam 46 and cam lobe 47.

As shown in FIG. 28, all of the above apparati except for the cutting tool 43 and its driving and supporting mechanism is supported by plate 65 slidably mounted on base 66 which is supported by legs (which are not shown). Plate 65 is capable of being advanced to the left and retracted by an interior screw device (not shown)

which is actuated by turning either handle 67 or handle 68 in the appropriate clockwise or counterclockwise direction.

FIG. 29 is a cut-away section of a portion of FIG. 28 showing the arrangement of gear wheel 58 which drives gear wheel 59 on top of which is wheel 60. Wheel 60 has a pin 61 extending upward and fitted into an opening of arm 62 so that arm 62 is driven to the left and then retracted to the right as the wheel 60 is rotated. As shown in FIG. 28, the forward and backward movement of arm 62 causes a forward and backward movement of arm 48 to which it is connected by pivotal connection 64.

As shown in FIG. 30, which is a cross-sectional view taken at line 30—30 of FIG. 28, shaft 48 is slidably mounted as a spline shaft through a spline driving gear in the interior of gear wheel 50 so that it will be rotated by rotation of gear wheel 50 simultaneously with its forward movement to the left and its backward movement to the right as effected by corresponding movement of rod 62. Splines 69 on rod 48 insure rotation of rod 48 with rotation of wheel 50. This rotation of shaft 48 effects the rotation of cam 46 and cam lobe 47. As previously indicated, the respective gears are selected of appropriate size to give exactly two revolutions of gear wheel 59 and attached wheel 60 per each revolution of gear wheel 50 and cam 46 and cam lobe 47. In this way the cam lobe has been advanced twice per revolution to form the reverse rises and has been twice retracted per revolution to form the rises. While other gear arrangements may be utilized for this purpose, it is essential that this ratio of two revolutions of the wheel causing sideward movement of the cam and cam lobe per revolution of the cam and cam lobe on their axis is essential for the production of a cam lobe having two rises and two reverse rises.

Therefore, where it is desired to produce a cam lobe having two rises and two reverse rises the gear arrangement is such as to effect two forward and backward movements of the cam and cam lobe per revolution thereof. Where it is desired to have three rises and three reverse rises per cam lobe, it will require gear wheel arrangements to give three forward and three backward movements per revolution of the cam lobe. Furthermore, while gear wheels are preferred for effecting the movements described, other equivalent means for effecting appropriate numbers of sideward movements per revolution of the cam lobe may be used.

FIG. 31 shows how both sides of the cam lobe are cut or ground. While it is preferred to cut one side of the lobe at a time, it is possible by proper adjustments and spacing to cut or grind both sides simultaneously. However in FIG. 31, cutter 43 is shown positioned to cut the first side of cam lobe 47 and later after this first side is finished, the cutting tool will be changed to one cutting in the reverse direction and positioned on the opposite side of the lobe with the sideward movements of the lobe adjusted and registered appropriately.

Moreover, where it is desired to alter the face of the cam to change or vary performance of the cam, such as for high revolutions per minute, an eccentric device may be added to wheel 60 and connector 61 to alter the wave-form of the cam lobe surface. However, for use in the engine herein described, the cam lobe described above is preferred.

The cam of this invention may have various modifications in addition to those shown above. For example, there may be greater or less thickness in the cam lobe described above. However there are practical limitations. Thus the thickness of a cam lobe between the top of a rise and the closest or opposing reverse rise determines the distance between the pair of bearings attached to a particular connecting rod. Therefore the maximum thickness of the cam lobe at its thickest portion, that is 0°, 90°, 180° and 270°, is determined by the maximum distance the engine can accommodate on the connecting rod between the two bearings. The minimum thickness of the cam at 0°, 90°, etc., is determined by what is the minimum thickness that can be tolerated between the sinusoidal surfaces at 45°, 135°, 225° and 315°.

There may also be variation in the distance from the inner edge of the bearing path on the cam lobe to the center line or axis of the mainshaft. Obviously the greater this distance is the greater will be the leverage for rotating the mainshaft on its axis. Again limitations on the size of the engine provide limitations on the maximum of this distance and the corresponding loss of leverage places a desirable minimum on this distance.

For a particular distance of the bearing path from the mainshaft axis the slopes of the sinusoidal curves at the inner and outer edges of the bearing path as well as the intermediate curves are determined by the distance between two planes both perpendicular to the axis of the mainshaft and one of which planes touches the top of each rise on a sinusoidal surface of the lobe and the other of which planes passes through the lowest point of the reverse rises in the same sinusoidal surface. The greater the distance between these two planes the greater will be the slope in that particular sinusoidal surface.

While the above-referred to variations are within the scope of this invention, it is contemplated that the specific cam lobe described above and in the drawings is considered most efficient for engine design.

In the cross-sections described above and illustrated in FIGS. 23a through FIG. 23i, the angle between the sinusoidal surfaces and the outside or annular surface of the cam lobe at 0°, 90°, 180° and 270° are in each case 90° as shown by the rectangular structure. At the other cross-sections the corresponding angles are at the top (or left) and at the bottom (or right) as follows: for the 22.5° cross-section, the top angle is 87°29' and the bottom angle is 82°22' for an average of 84°40.5'; for the 45° cross-section, the top angle is 83°9' and the bottom angle is 82°36' for an average of 82°27.5'; for the 67.5° cross-section, the top angle is 85°46' and the bottom angle is 87°22' for an average of 86°34'; for the 112.5° cross-section, the top angle is 84°17' and the bottom angle is 87°49' for an average of 86°3'; for the 135° cross-section, the top angle is 84°17' and the bottom angle is 83°9' for an average of 83°43.2'; and for the 157.5° cross-section, the top angle is 86°34' and the bottom angle is 85°32' for an average of 86°3'.

It may be seen from these average angle values therefore that there is a sharper overall incline or angle for the 45°, 135°, 225° and 315° cross-sectional lines than for the intermediate values of 22.5°, 67.5°, etc., as well as for the rectangular cross-sections at 0°, 90°, 180° and 270°.

The angles described above for FIG. 23 may vary slightly from the values actually recited. However when the cutter used in producing the cam (and therefore the bearings used on sinusoidal surfaces) have greater or smaller diameters than for those reported above, the variance in angle values may be more substantial.

There may be some question as to why the values differ for the lengths of the two vertical lines making up the right side of the figure, that is the portions above and below the center line for FIGS. 23b, 23c, 23d, etc. The reason for these differences is that the action of the cutting tool for producing the cam is designed to duplicate the sine wave action of a standard crankshaft. It is possible by adjustment of the cutting tool action to make the two portions of these lines equal or even to reverse the differences. In such latter cases the angles described above will be slightly modified accordingly. In such cases also it is desirable that the diameter of the bearings used on the sinusoidal surfaces and the action of the bearings in relation to the movement of the pistons should be identical to that of the cutting tool used to produce the cam.

In general, however, for the cam lobe as described in FIG. 23, for the 22.5°, 67.5°, 112.5°, 157.5°, 202.5°, 247.5°, 292.5° and 337.5° cross-section, the average for the top and bottom angles is advantageously in the range of about 84°-87°; and for the 45°, 135°, 225° and 315° cross-sections the average for the top and bottom angles is advantageously in the range of 82°-84°.

However as stated several times previously, the exact angle will be determined by the cutting tool and its action in producing the sinusoidal surfaces to correspond to the diameter of the bearing to be used and the operation thereof in relation to the piston action.

In FIG. 5 of the drawings there is a planar representation of a sinusoidal curve through 180° of the cam. In other words, the length of the line HR is the linear distance representing ½ of the circumference of a circle running around the cam. If this circle is an imaginary horizontal circle running around the cam at the height of the rises, and another imaginary circle in the same plane as for the first circle is taken inward at a point where the inner edge of a roller bearing will be riding on the sinusoidal surface, this inner circle will have a shorter radius and therefore a shorter circumference. Therefore the line HR for such a circle will have a shorter length representing ½ its circumference. However the dip or distance from line HR to DRR will be the same in both cases. Therefore the sinusoidal curve for this inner circle will have a greater slope because it has to go the same vertical distance within a shorter horizontal distance. These differences in slope are present, although with variations, whether, as described herein, the various imaginary planes intersecting the sinusoidal surfaces produce lines for a rectangular cross-section or for a truncated trapezoid as shown for the present invention.

In summary the cam of this invention may be described as having: a pair of similar axially spaced annular surfaces, each of these surfaces defining sinusoidal paths running in a circular direction, for which sinusoidal paths each includes at least 2 rises and 2 dips (reverse rises) with a dip being equidistant from each adjacent rise and with a dip on the one sinusoidal path being opposite a rise on the other sinusoidal path, and these sinusoidal paths each being adapted to have at least one cylindrical bearing travel thereon with the axis of the bearing perpendicular to the axis of the annular surfaces.

Furthermore in this cam the sinusoidal paths each have a lesser slope from rise to dip and from dip to rise at an area more remote from the axis of said annular surface in comparison to a greater corresponding slope in an area thereof closer to the axis of the annular surface with the slopes in intermediate areas increasing progressively and gradually from the said lesser slope to the said greater slope.

Also in this cam the distance between the sinusoidal paths projected on an imaginary plane coinciding with and rotated around the axis of the said annular surfaces varies throughout a circumferential sweep of said plane with the exception of the points between the top of each rise of the sinusoidal path and bottom of each dip on the opposite sinusoidal path. In the cam lobe the said annular surfaces are separated by an annular wall.

In the above-described cam lobe, the opposite sinusoidal paths are adapted to have a pair of bearings arranged with the axis of each bearing lying in a plane passing through the axis of said annular surfaces and secured axially spaced apart for circumferential movement together, one bearing for each sinusoidal path, with each of the said sinusoidal surfaces being adapted to have full line contact across the width of the bearing while said bearing is in contact with the said sinusoidal surface.

In FIGS. 23a, 23e and 23i, as well as in 24a, 24e and the horizontal lines at the top and bottom represent the contact line between the upper and lower surfaces of a cam lobe having a thickness at the outer edge of the lobe of 1.000 inch and a cylindrical bearing having a width of 0.500 inch across the cylindrical surface of the bearing. The bearing has one cylindrical edge (its outer edge) at the outer edge of the cam lobe and its other (or inner edge) at 0.500 inch in from the outer edge of the lobe. The vertical dotted line in each case is an imaginary line parallel to the vertical outer edge of the lobe and connecting the inner edges of the contact paths of bearings with the cam lobe surface. In the other figures between FIGS. 23a and 23i the imaginary or dotted lines are kept parallel and still 0.005 inch distant from the vertical outer edge of the lobe. The other distances vary according to the distances shown in the respective figures.

With regard to references herein to steeper and lesser slopes, the steepest slope of the cam lobe, for example as shown in FIG. 22a, is at the contact line between lobe 3 and cam drum 9, and the outer edge of the cam lobe has a less steep slope. This difference is shown in a comparison of FIGS. 8 and 6. FIG. 8 shows a steeper slope of the cam lobe at its contact line with the inner edge of a bearing and FIG. 6 shows a lesser slope for the line of contact of the cam lobe with the outer edge of the bearing.

In the discussions above the respective angles such as shown in FIGS. 23a through 23i are in cross-sections of particular cam taken at various points around the circumference of the cam. The angles shown in these figures are taken from a cam held with its axis in a vertical position and the intersecting plane coincides with the axis of the cam and is moved in a clockwise direction about this axis or the intersecting plane is held stationary and the cam is rotated on its axis in a counterclockwise direction.

As previously stated, the angles at the top and bottom of the cross-sections of FIGS. 23a through 23i, etc., depend on a number of factors including the diameter of the outer circumference of the cam lobe, the thickness of the lobe or web at the position at which the plane intersects the lobe, the diameter of the cutting or grinding tool used to make the sinusoidal surface, the speed of advancement (variable or constant) and retraction in cutting the cam lobe, and the length of the piston stroke, which latter measurement represents also the radial distance between the imaginary circles both of which have their centers in the axis of the cam, one of which touches the outer edge top of the rises and the other of which touches the outer edge bottom of the reverse rises.

These variations in the respective angles are illustrated by the following table which compares the respective angles shown for the cam whose cross-sections are depicted in FIGS. 23a through 23i with smaller and larger cams, in one case a smaller cam having an outside diameter of 5.000 inches for a stroke of 1.875 inches and a cutting tool having 1.500 inch diameter, and in the other case a larger cam having an outside diameter of 8.750 inches with a stroke of 3.5" inches and made with a cutting tool having a diameter of 2.000 inches. The cam used for the cross-sections of FIGS. 23a through 23i has an outer diameter of 6.992 inches, a stroke of 1.875 inches and was made with a cutting tool having a diameter of 1.500 inches. The angles reported in this table are actual measurements on the respective cams.

distance travelled by the piston arm bottom B is much greater, namely 0.586", and in the next 30° (from 60° to 90°), the travel distance of B is even greater, namely 1.074. From 120° to 180° the rate of travel decreases as shown. Similar increases and decreases are effected by the cam except that the corresponding distances are effected in half the degree of revolution of the cam as for the crankshaft.

These effects are built into the cam by the nature of the gear wheel movement in the apparatus of this invention (FIGS. 27–30) whereby arm 62 (fixed hypotenus) is moved forward and backward to advance and retract cam 46. The rate of advancement and retraction of the cam is controlled by the circular motion of gear wheel 60 which duplicates crankshaft movement except that this gear wheel is revolved double the rate that a crankshaft would revolve. Thus, initial rotation of wheel 60 effects a small movement of arm 62, for example, from 0° to 30°, and this increases from 30° to 60° and even more from 90° to 120°. Then the rate decreases from 120° through 180° as shown in FIG. 25. This variable

| Circum-ference Angles | Smaller Cam Cutting Tool 1.5000" dia. Cam Outside Dia = 5.000" Stroke = 1.875 | | Cam shown in Figs. 23a through 23i Cutting Tool 1.500" dia. Cam Outside Dia = 6.992" Stroke = 1.875 | | Larger Cam Cutting Tool 2.000" dia. Cam Outside Dia = 8.750" Stroke = 3.5" | |
|---|---|---|---|---|---|---|
| | Top | Bottom | Top | Bottom | Top | Bottom |
| 0° | 90° | 90° | 90° | 90° | 90° | 90° |
| 22.5° | 87°56' | 82°32' | 87°29' | 82°22' | 88°30' | 89°0' |
| 45° | 85°32' | 77°39' | 83°9' | 82°36' | 86°0' | 84°0' |
| 67.5° | 77°32' | 87°56' | 85°46' | 87°22' | 88.°30' | 84°30' |
| 90° | 90° | 90° | 90° | 90° | 90° | 90° |
| 112.5 | 81°58' | 88°31' | 84°17' | 87°49' | 88°0' | 86°30' |
| 135° | 82°11' | 83°34' | 84°17' | 83°9' | 87°30' | 88°0' |
| 157.5° | 81°01' | 80°41 | 86°34' | 85°32' | 88°0' | 87°30' |
| 180° | 90° | 90° | 90° | 90° | 90° | 90° |

In cutting the cam lobe in accordance with the method and apparatus described above, the cutting tool is positioned adjacent to a flat end of the cylindrical cam so that as the revolving cam is advanced and retracted the originally flat end of the cam will be brought into contact against the side of the cutting tool. As the cylindrical cam is progressively and incrementally advanced against the tool, the reverse rise or dip will be cut into the cam. The cutting tool is positioned sufficiently below the cylindrical surface of the cam so that as its cutting is effected on the cylindrical shape, the width of the lobe cut into the cam is as wide or wider than the width of the bearing which is to ride on the sinusoidal cam lobe surface.

Reference has been made above to the fact that a preferred modification of the cam resembles the action of a crankshaft except that the cam of this invention gives double the action of a crankshaft. FIGS. 1 and 25 illustrate the operation of a crankshaft. In FIG. 1, the circle may represent the revolution of a crankshaft with point E representing the bottom end of the piston rod and point C representing the top of the piston rod. As the crankshaft is revolved, the top of the piston arm follows the circular path shown with a fixed hypotenus D. At first, through 10° and 20° of movement there is only a small movement of the bottom of the piston along the vertical path extending downward from B. The points of this bottom B of the piston arm is indicated on this vertical line as 10° and 20°. In FIG. 25 the chart shows that at 30° this distance is only 0.196" of the overall 4' stroke. In the next 30° of travel (from 30° to 60°) on the circle or crankshaft revolution of FIG. 1, the rate of advancement and retraction results in translating crankshaft operation into the cam lobe being cut in the cam. Thus this provides automatic, mechanical control of the rate of advancement and retraction of the cam versus the cutting tool with total synchronization with the rotation of the cam.

It is also possible to vary the wave form of the sinusoidal surface within the same scope of the stroke, which variations would change from the standard crankshaft type of operation. This can be accomplished by making variations in the effective length of the hypotenuse so as to change toward and even effect a constant rate of speed. With a constant rate of speed the sine wave will become completely symmetrical. These changes in effective length of the hypotenuse can be effected by combinations of eccentric and planetary gears.

While certain features of this invention have been described in detail with respect to various embodiments thereof, it will of course be apparent that other modifications can be made within the spirit and scope of this invention, and it is not intended to limit the invention to the exact details shown above except insofar as they are defined in the following claims.

The invention claimed is:

1. Apparatus for producing a cam having sinusoidal cam lobe surfaces, which comprises (1) a first supporting means for rotatably supporting a cylinder workpiece; (2) a first rotating means for rotating said cylinder at a controlled rate about its cylindrical axis; (3) a second supporting means for supporting a cutting or grinding tool, (4) a rotating means for rotating said tool; (5) an advancing and retracting means for advancing and retracting said cylinder supporting means, said advancing and retracting means being adapted to position a flat end of said cylinder adjacent to and in cutting or grinding relationship with the side of said cutting or grinding tool; (6) a third supporting means for supporting said advancing and retracting means; and (7) a moving means for moving said third supporting means incrementally toward said tool.

2. The apparatus of claim 1 in which said advancing and retracting means is adapted to advance said cylinder supporting means at least two per revolution of said cylinder in accordance with the number of reverse rises to be produced in said cam lobe surface and is also adapted to retract said cylinder supporting means a corresponding number of times per revolution to produce a corresponding number of rises in said cam lobe surface.

3. The apparatus of claim 2 in which said advancing and retracting means are gear-activated with the respective gear arrangements giving a gear ratio suitable to producing the desired number of advancements and retractions per revolution of said cylinder to produce the desired number of reverse rises and rises in the sinusoidal surfaces produced.

4. The apparatus of claim 1 in which said advancing and retracting means is adapted to advance said cylinder supporting means two times per revolution of said cylinder in accordance with the two reverse rises to be produced in said cam lobe surface and is also adapted to retract said cylinder supporting means two times per revolution to produce two rises in said cam lobe surface.

* * * * *

UNITED STATES PATENT AND TRADEMARK OFFICE
CERTIFICATE OF CORRECTION

PATENT NO.  : 4,639,173

DATED       : Jan. 27, 1987

INVENTOR(S) : Francis E. Waller

It is certified that error appears in the above-identified patent and that said Letters Patent is hereby corrected as shown below:

Col. 10, lines 9 and 10, correct "135"" and "180"" to read "135°" and "180°" respectively.

Col. 16, line 43, correct "values" to read "valves".

Col. 25, line 14, after "two" insert "times".

Signed and Sealed this

Twenty-first Day of April, 1987

Attest:

DONALD J. QUIGG

Attesting Officer     Commissioner of Patents and Trademarks